United States Patent
Otsuka

(10) Patent No.: US 8,913,297 B2
(45) Date of Patent: Dec. 16, 2014

(54) IMAGE FORMATION METHOD AND APPARATUS FOR PRINTING IMAGES USING REDUCED AMOUNT OF DEVELOPER

(71) Applicant: Oki Data Corporation, Tokyo (JP)

(72) Inventor: Naoki Otsuka, Tokyo (JP)

(73) Assignee: Oki Data Corporation, Tokyo (JP)

(*) Notice: Subject to any disclaimer, the term of this patent is extended or adjusted under 35 U.S.C. 154(b) by 26 days.

(21) Appl. No.: 13/832,524

(22) Filed: Mar. 15, 2013

(65) Prior Publication Data

US 2013/0258412 A1    Oct. 3, 2013

(30) Foreign Application Priority Data

Mar. 28, 2012  (JP) ................................. 2012-074155

(51) Int. Cl.
*H04N 1/40*       (2006.01)
*G06K 15/00*      (2006.01)
*H04N 1/00*       (2006.01)

(52) U.S. Cl.
CPC ............... *G06K 15/002* (2013.01); *H04N 1/00* (2013.01)
USPC ......... 358/3.23; 358/1.9; 358/1.13; 358/1.15; 399/27; 399/53

(58) Field of Classification Search
None
See application file for complete search history.

(56) References Cited

U.S. PATENT DOCUMENTS

| | | | |
|---|---|---|---|
| 5,663,750 A * | 9/1997 | Sakuma | 347/7 |
| 5,668,635 A * | 9/1997 | Tomida et al. | 358/296 |
| 5,751,434 A * | 5/1998 | Narendranath et al. | 358/1.9 |
| 7,298,522 B2 * | 11/2007 | Sugimoto | 358/1.3 |
| 2005/0018230 A1 * | 1/2005 | Green et al. | 358/1.13 |

FOREIGN PATENT DOCUMENTS

JP        10-044532 A     2/1998

* cited by examiner

*Primary Examiner* — Dung Tran
(74) *Attorney, Agent, or Firm* — Marvin A. Motsenbocker; Mots Law, PLLC

(57) ABSTRACT

An image formation apparatus includes a memory to store image data including objects each having information on a type and densities of colors of the object, a developer-remaining-amount sensor to sense and output remaining-amount information indicating a color of a developer having a small remaining amount among colors of respective developers for image formation, a controller to transform first pixel values of the densities of the colors of each object included in the image data stored in the memory into second pixel values indicating use amounts of the colors of the developers, for each object based on the type of the object and the remaining-amount information, an image formation unit to form images on a recording medium for the objects included in the image data by using the developers in accordance with the use amounts of the developers corresponding to the second pixel values transformed by the controller.

13 Claims, 11 Drawing Sheets

IMAGE FORMATION APPARATUS IN EMBODIMENT 1

FIG.3A

OBJECT INFORMATION TABLE 4b IN FIG. 1 → 4b

| COORDINATE VALUE | OBJECT ID |
|---|---|
| (0, 0) | 0 |
| (0, 1) | 0 |
| (0, 2) | 0 |
| ... | |
| (551, 1023) | 2 |
| ... | |
| (2015, 2022) | 3 |
| ... | |
| (1321, 2800) | 4 |
| ... | |

FIG.3B

OBJECT INFORMATION TABLE 4c IN FIG. 1 → 4c

| OBJECT ID | TYPE α | PIXEL TRANSFORMATION MATRIX [A] |
|---|---|---|
| 0 | NONE | $|A_0|$ |
| 1 | TEXT | $|A_1|$ |
| 2 | TEXT | $|A_1|$ |
| 3 | IMAGE | $|A_2|$ |
| 4 | IMAGE | $|A_2|$ |

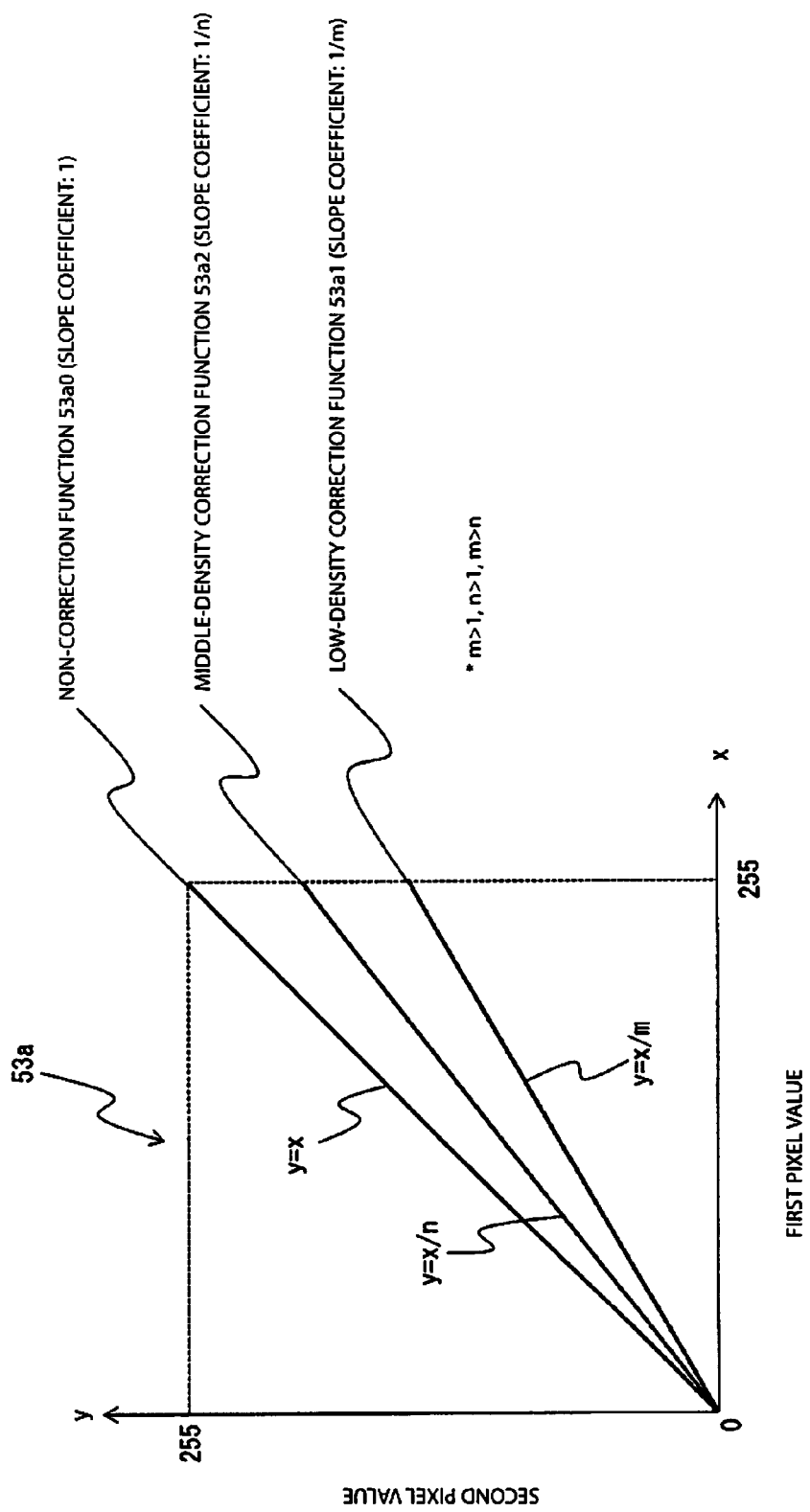

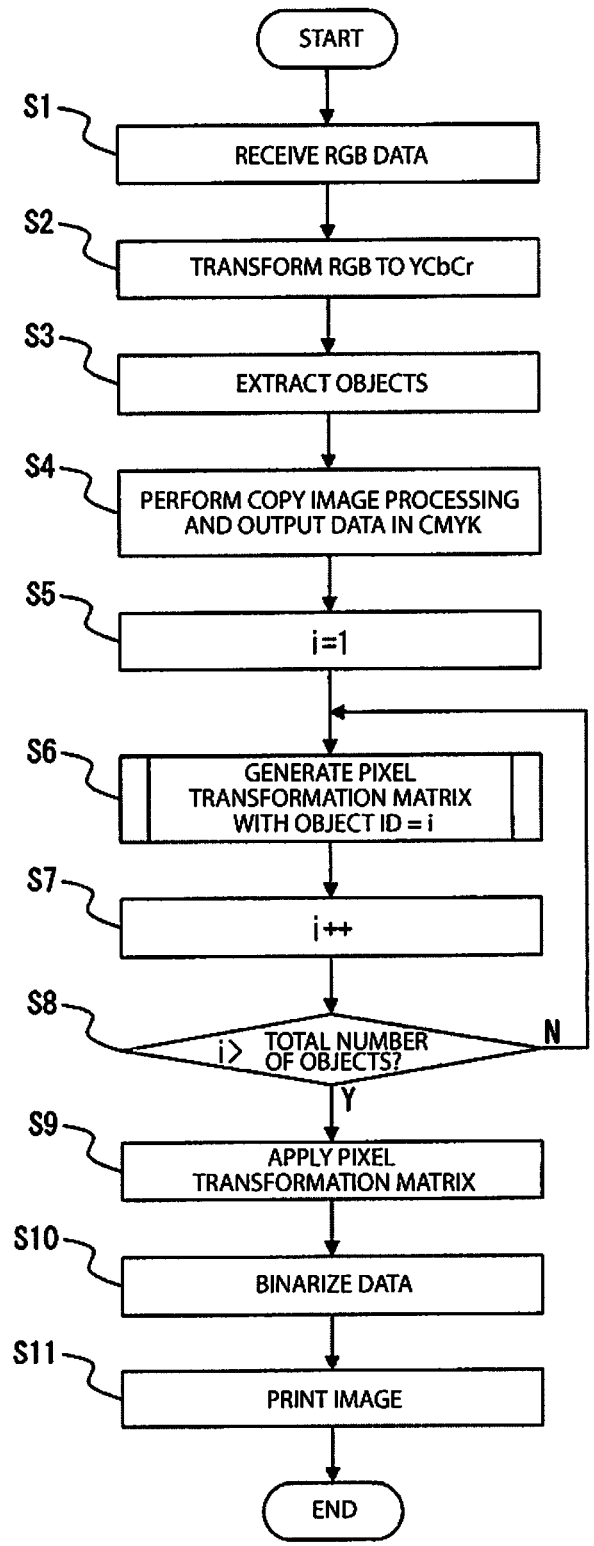
FIG.5 FLOWCHART OF IMAGE FORMATION PROCESSING IN FIG. 1

FLOWCHART OF IMAGE FORMATION PROCESSING IN FIG. 7

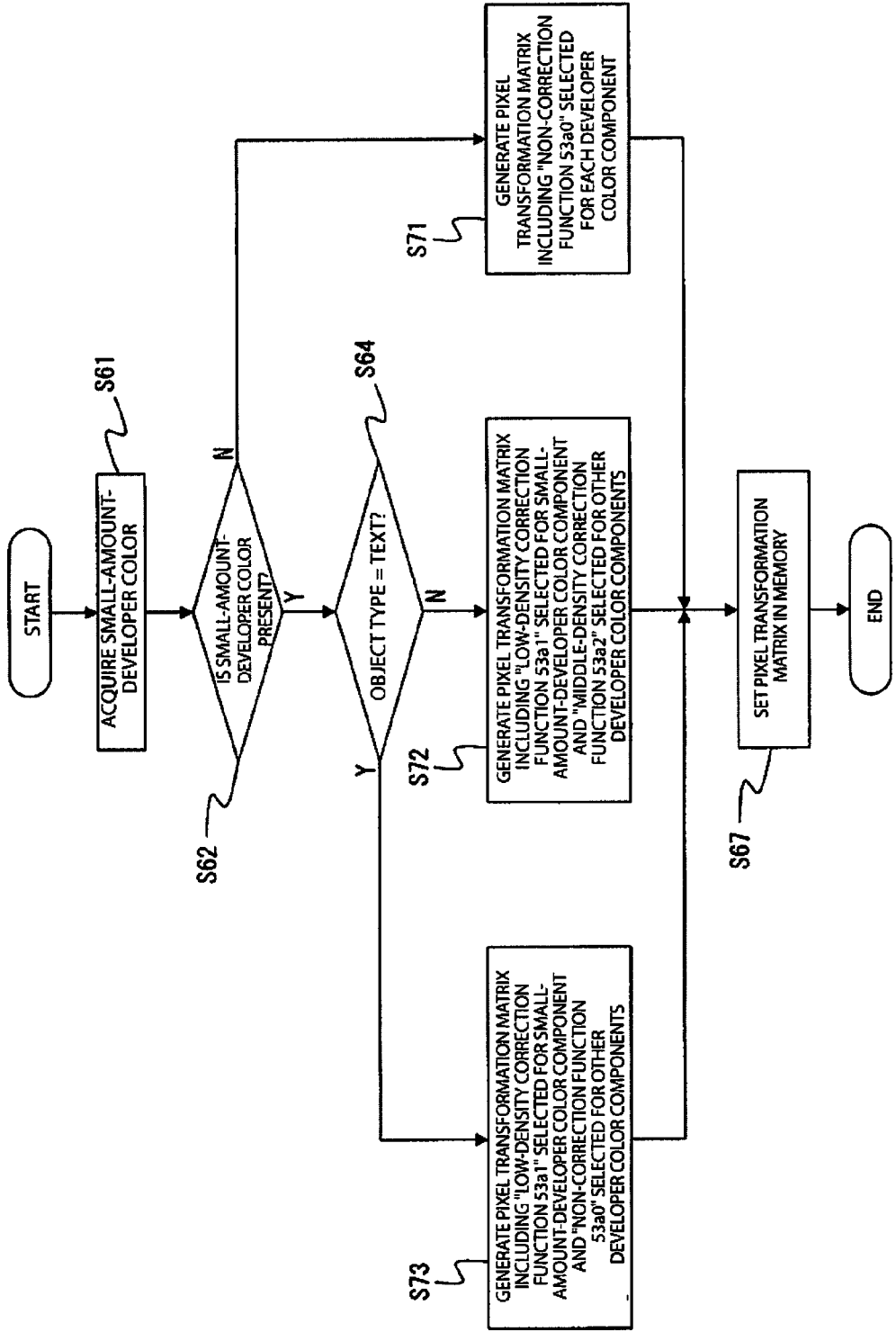

IMAGE FORMATION METHOD AND APPARATUS FOR PRINTING IMAGES USING REDUCED AMOUNT OF DEVELOPER

CROSS REFERENCE TO RELATED APPLICATIONS

This application claims priority based on 35 USC 119 from prior Japanese Patent Application No. 2012-074155 filed on Mar. 28, 2012, entitled "IMAGE FORMATION METHOD AND IMAGE FORMATION APPARATUS", the entire contents of which are incorporated herein by reference.

1. FIELD OF THE INVENTION

The disclosure relates to an image formation method and an image formation apparatus which performs image processing using a reduced amount of a developer when the remaining amount of the developer becomes small.

2. DESCRIPTION OF RELATED ART

Image data often includes a text object expressing letters and other symbols, and an image object expressing a halftone image having gradations. In a known type of conventional image formation method and image formation apparatus, data for printing is obtained from such image data by changing tables for transforming pixel values depending on the object types such as text and image objects, as described in Japanese Patent Application Publication No. Hei 10-44532, for example.

SUMMARY OF THE INVENTION

The conventional image formation method and image formation apparatus, however, have the following problems (a) and (b).

(a) Since a pixel-value transformation table for color printing has fixed values, any reduction in the use amount of a developer having a small remaining amount of developer causes an image to have a drastically changed hue and thus to appear unnatural.

(b) Since the pixel-value transformation table for color printing has fixed values, a reduction in the use amount of the developer having a small remaining amount of developer causes text to have an extremely reduced density and thus making the text difficult to read.

An aspect of the invention is an image formation method. The method includes: a data storage step of storing in a memory image data including objects each having information on a type and densities of colors of the object; an object extraction step of extracting each of the objects and the type of the object, where each object is included in the image data stored in the memory, and including first pixel values indicating the densities of the colors of the object; a matrix generation step of acquiring remaining-amount information indicating a color of a developer having a small remaining amount among colors of respective developers for image formation, and then generating, based on the remaining-amount information and the type of the object, a pixel transformation matrix for transforming the first pixel values into second pixel values indicating use amounts of the colors of the developers; a pixel value transformation step of transforming the first pixel values into the second pixel values for the respective colors of the developers based on the pixel transformation matrix; and an image formation step of forming images of the respective plurality of objects included in the image data based on the use amounts of the developers corresponding to the second pixel values transformed in the pixel value transformation step. The steps are executed in the above cited order.

According to the aspect of the invention, an image, text, and the like are formed in such a manner that the use amounts of the developers are adjusted based on the type of each object included in the image data and the remaining-amount information indicating the color of the developer having a small remaining amount. This provides advantageous effects in which even when a color of a developer having a small remaining amount is sensed, image formation can be continued in the following manner. Specifically, the hue of an image is not drastically changed while the use amount of the developer is reduced; the hue of the image is maintained without extremely reducing the density of a color of text; and the readability of the text is not deteriorated.

BRIEF DESCRIPTION OF THE DRAWINGS

FIGS. 3A and 3B are tables showing examples of object information tables 4b and 4c stored in memory 4 in FIG. 1.

FIG. 4 is a graph showing an example of pixel-value-correction-function table 53a in FIG. 1.

FIG. 5 is a flowchart showing the image formation processing of the image formation apparatus in FIG. 1.

FIG. 11 is a flowchart showing the pixel-transformation-matrix generation processing in Step S16 in FIG. 10.

DETAILED DESCRIPTION OF EMBODIMENTS

Figure 1:
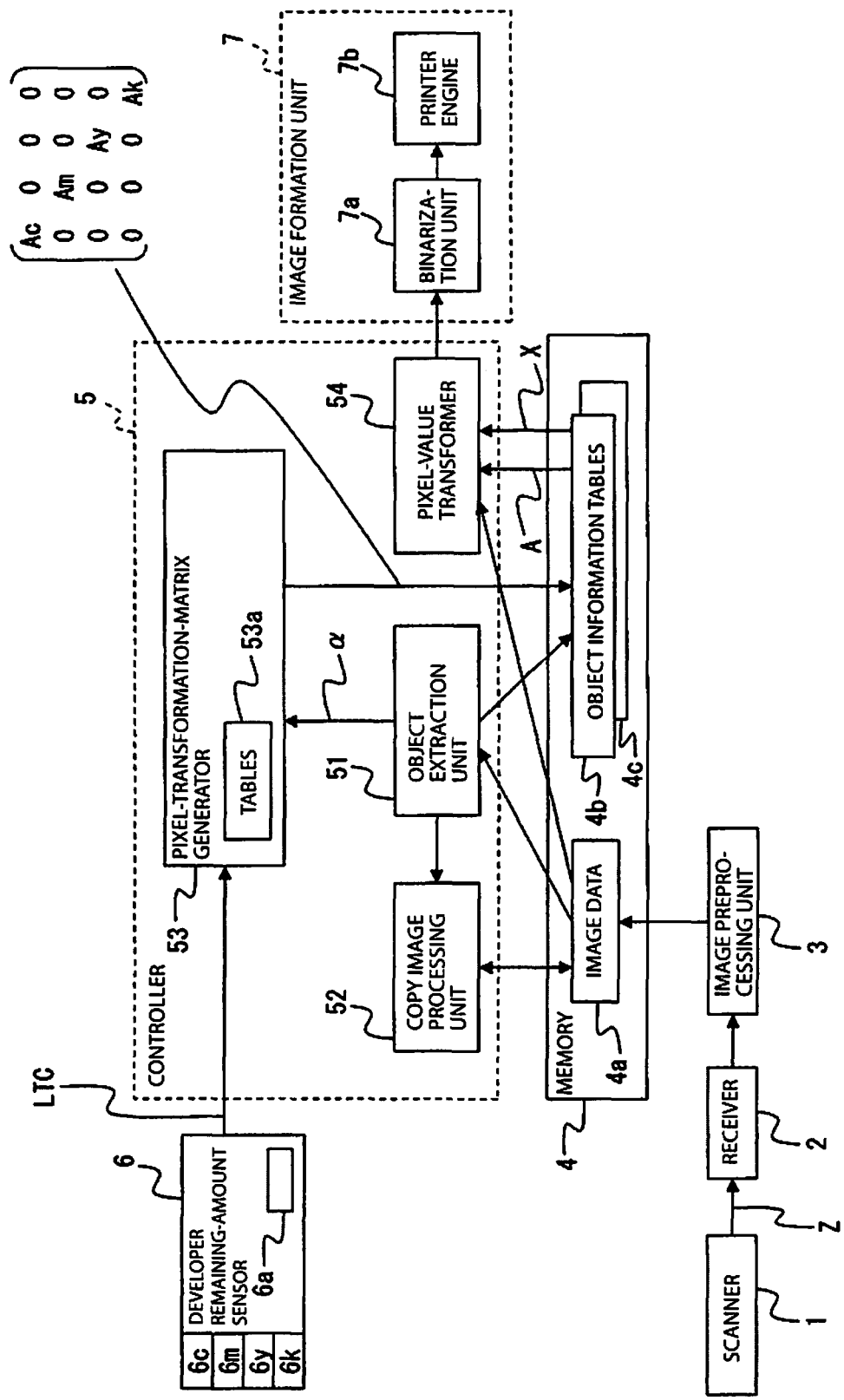
FIG. 1 is a block diagram showing a schematic configuration of an image formation apparatus in Embodiment 1 of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Modes for carrying out the invention are made clear by reading the following description of preferable embodiments with reference to the attached drawings. The drawings, however, are provided for illustration only and do not limit the scope of the invention.

[Embodiment 1]

(Configuration in Embodiment 1)

FIG. 1 is a block diagram showing a schematic configuration of an image formation apparatus in Embodiment 1 of the invention.

The image formation apparatus in Embodiment 1 is, for example, a copier, and includes scanner 1, receiver 2, image preprocessing unit 3, memory 4, controller 5, developer remaining-amount sensor 6, and image formation unit 7.

Scanner 1 transforms a color density of each pixel value of an original image such as a print, a book or a photo into electric signal Z, and is connected to receiver 2 on the output side of scanner 1. Receiver 2 is an interface configured to transform inputted electric signal Z into RGB image data expressed by the RGB color space formed by a cube of red, green, and blue (RGB) and to output the RGB image data, and is connected to image preprocessing unit 3 on the output side of receiver 2.

Image preprocessing unit 3 transforms the inputted RGB image data into image data 4a expressed by using 256 tones in the YCbCr color space formed by luminance signal Y and two color signals Cb and Cr, and is connected to memory 4 on the output side of image preprocessing unit 3.

Memory 4 temporarily stores therein image data 4a, object information tables 4b and 4c, and the like. Memory 4 is connected to controller 5.

Controller 5 is connected to memory 4, developer remaining-amount sensor 6, and image formation unit 7. Controller 5 transforms first pixel value X into second pixel value Y based on an output result of developer remaining-amount sensor 6 and an analysis result of image data 4a stored in memory 4. A first pixel value X indicates the density of each of the colors of each of the multiple objects included in image data 4a, and a second pixel value Y indicates a use amount of the color of a corresponding one of the developers. Controller 5 includes object extraction unit 51, copy image processing unit 52, pixel-transformation-matrix generator 53, and pixel-value transformer 54, and is formed by a central processing unit (CPU) and the like.

Object extraction unit 51 performs region separation on image data 4a to determine what is referred to herein as a type α of each of the multiple objects. Image data 4a is transformed using the 256 tones in the YCbCr color space by image preprocessing unit 3 and is stored in memory 4. Type α includes an "image object" and a "text object". Copy image processing unit 52 and pixel-transformation-matrix generator 53 are connected to object extraction unit 51.

Copy image processing unit 52 is configured to: read image data 4a transformed using the 256 tones in the YCbCr color space by image preprocessing unit 3 and stored in memory 4; adjust image data 4a to be optimum data for copying in accordance with a determined type α inputted from object extraction unit 51; and write optimum image data 4a to memory 4 again.

Developer remaining-amount sensor 6 senses a remaining amount of developer for each of the colors of cyan (C), magenta (M), yellow (Y), and black (K) (jointly as CMYK) of respective developer tanks 6c, 6m, 6y, and 6k which are installed in the image formation apparatus, and stores, in memory 6a, remaining-amount information LTC, indicating a color of a developer having a small remaining amount. Pixel-transformation-matrix generator 53 in controller 5 is connected to developer remaining-amount sensor 6 on its output side. As a method of sensing a remaining amount of a developer, the following method is conceivable, for example. Specifically, an integrated circuit (IC) tag is embedded in each of developer tanks 6c, 6m, 6y, and 6k for the corresponding color, a value obtained by subtracting a use amount of the corresponding developer from an amount thereof before use is overwritten to a value in the IC tag. When the amount of the developer becomes equal to or lower than a predetermined value, information on the color of the developer is stored as remaining-amount information LTC in memory 6a.

Pixel-transformation-matrix generator 53 generates a pixel transformation matrix for each object included in image data 4a extracted by object extraction unit 51, and stores the generated pixel transformation matrix in a pixel transformation matrix column in object information table 4c in memory 4.

Pixel-value transformer 54 transforms a first pixel value X into a second pixel value Y for each of the objects included in image data 4a based on the corresponding pixel transformation matrix, by referring to image data 4a and object information table 4c which are stored in memory 4, first pixel value X indicating the density of each color of each object, second pixel value Y indicating the use amount of the color of the corresponding developer. Then, pixel-value transformer 54 outputs second pixel value Y, transformed for each object, to image formation unit 7.

Image formation unit 7 forms an image by printing each object included in image data 4a on a recording medium, such as paper, in accordance with the use amount of each developer corresponding to transformed second pixel value Y.

Figure 2:
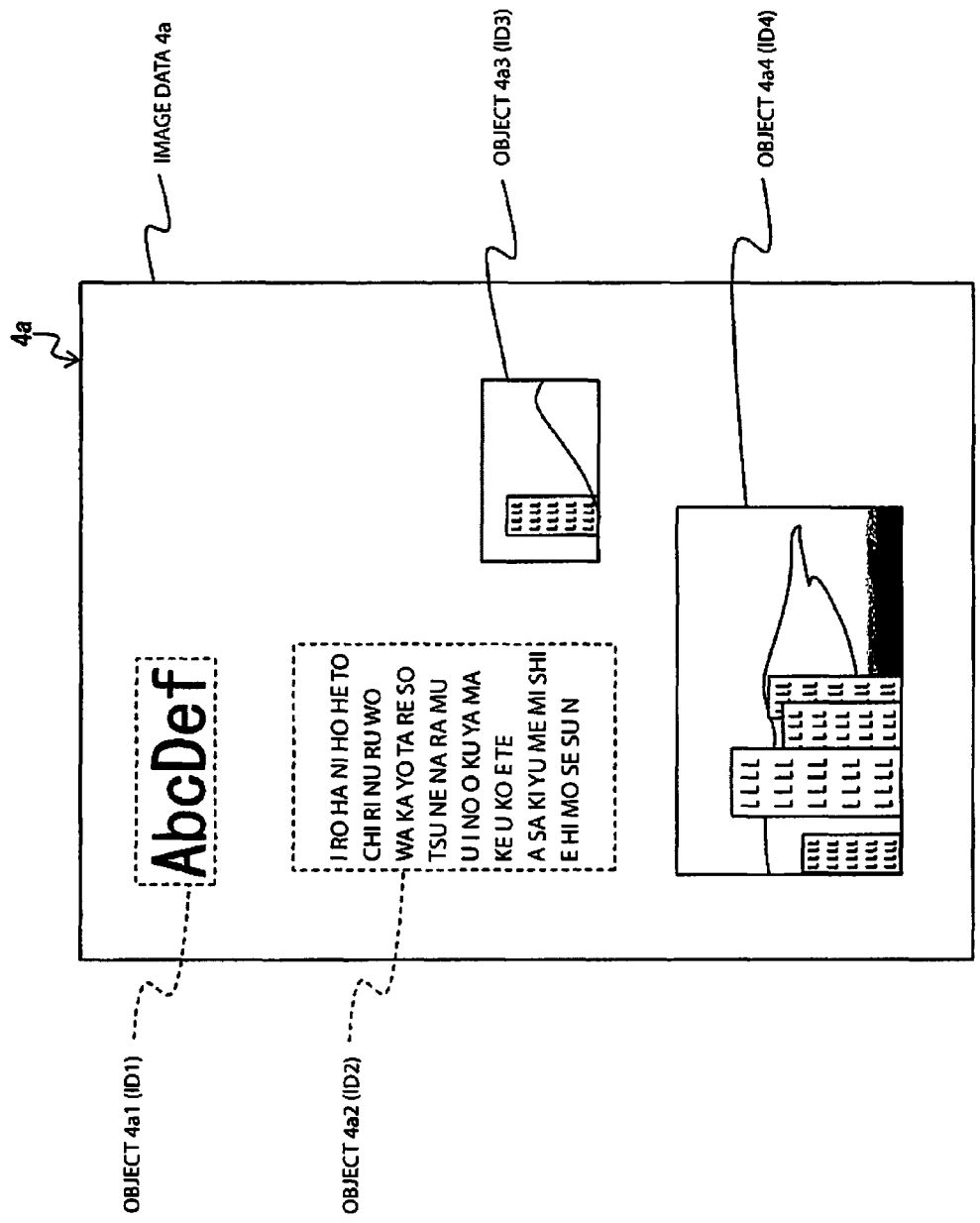
FIG. 2 is a diagram showing an example of image data 4a stored in memory 4 in FIG. 1.

FIG. 2 is a diagram showing an example of image data 4a stored in memory 4 in FIG. 1. As shown in FIG. 2, image data 4a is a set of first pixel values X each of which is one of 256 tone values of each of the four colors of CMYK. Image data 4a is recognized based on the region separation performed by object extraction unit 51.

Image data 4a includes text objects 4a1 and 4a2 of "Abc-Def" and "i ro ha ni . . . e hi mo se su n", image object 4a3 depicting a part of a building, and image object 4a4 depicting a landscape including buildings, a cloud, mist, and the like. From the example in FIG. 2, it is found that text objects 4a1 and 4a2 have character contours and the same first pixel value X, and image objects 4a3 and 4a4 have shapes and multiple first pixel values X. When how a human recognizes information is considered, this shows that the density of a color representing a contour of a character is important for text objects 4a1 and 4a2, and the hue representing a ratio of colors and gradation representing change of color density is important for image objects 4a3 and 4a4.

In FIG. 2, each object is provided with a result of the region separation performed by object extraction unit 51. Regions 4a1 and 4a2 are extracted as "text" regions, while regions 4a3 and 4a4 are extracted as "image" regions. In addition, an object ID i (i=1, 2, 3 or 4) is assigned to each of objects 4a1, 4a2, 4a3, and 4a4 as a number for identification. The object extraction results are stored in memory 4 in the forms of object information tables 4b and 4c.

FIGS. 3A and 3B are tables showing examples of object information tables 4b and 4c stored in memory 4 in FIG. 1.

Object information table 4b includes a coordinates column and an object ID column. A coordinate value in image data 4a is associated with an object ID assigned to a corresponding one of the objects subjected to the region separation, the coordinate value belonging to the object. Here, a value of 0 is set for an object ID of a pixel which does not belong to any object. FIG. 3A shows an example in which 0 is set for object IDs associated with coordinate values (0, 0), (0, 1), and (0, 2) which do not belong to any object. FIG. 3A also shows the example in which 2, 3, and 4 are set for object IDs associated with coordinate values (551, 1023), (2015, 2022), and (1321, 2800), respectively.

Object information table 4c includes an object ID column, a type α column, and a pixel transformation matrix column, and is a table storing types α and pixel transformation matrices which are associated with object IDs of objects 4a1 to 4a4 included in image data 4a. As type α, "none" is associated with an object ID of 0; "text" (character), object IDs of 1 and 2; and "image", object IDs of 3 and 4. A description is given later of the pixel transformation matrices stored in the pixel transformation matrix column.

FIG. 4 is a graph showing an example of one of pixel-value-correction-function tables 53a in FIG. 1. The x axis in a horizontal direction represents first pixel value X in a range from 0 to 255, while the axis y in a vertical direction represents second pixel value Y in the range from 0 to 255. FIG. 4 shows one of pixel-value-correction-function tables 53a for a particular color, for example, cyan (C). Each pixel-value-correction-function table 53a is stored in pixel-transformation-matrix generator 53 and three types of slope coefficients are applied thereto. Since each color is based on 256 tones, the pixel values on the x and y axes range from 0 to 255.

In FIG. 4, non-correction function 53a0 exhibits a straight line having a slope coefficient of 1 and extending from the origin (0, 0) of the xy coordinates to coordinates (255, 255), and first pixel value X is equal to second pixel value Y. Low-density correction function 53a1 exhibits a straight line having a slope coefficient of 1/m and extending from the origin (0, 0) of the xy coordinates to coordinates (255, 255/m). Second pixel value Y in low-density correction function 53a1 is smaller than second pixel value Y in non-correction function 53a0. Middle-density correction function 53a2 exhibits a straight line having a slope coefficient of 1/n and extending from the origin (0, 0) of the xy coordinates to coordinates (255, 255/n). Second pixel value Y in middle-density correction function 53a2 is smaller than second pixel value Y in non-correction function 53a0, but larger than second pixel value Y in low-density correction function 53a1. In other words, m and n are larger than 1, and m is larger than n.

(Operation in Embodiment 1)

Descriptions are next given of (I) Overall operation of the image formation apparatus, (II) Method of generating the pixel transformation matrix, and (III) Image formation method.

(I) Overall Operation of the Image Formation Apparatus

With reference to FIGS. 2 to 4, a description is given of an overall operation of the image formation apparatus in FIG. 1. In FIG. 1, scanner 1 reads an original image of a document, a book, a photo or the like, transforms the original image into electric signals Z and outputs electric signals Z to receiver 2. Receiver 2 transforms the inputted electric signals Z into image data expressed using the RGB color space and outputs the image data to image preprocessing unit 3. Image preprocessing unit 3 transforms the inputted RGB image data to image data 9a, expressed by using the 256 tones in the YCbCr color space, and temporarily stores image data 4a in memory 4.

Object extraction unit 51 performs the region separation on image data 4a stored in memory 4 and determines type α of each of objects 4a1 to 4a4 included in image data 4a, type α being an "image object" or a "text object". Then, object extraction unit 51 stores a coordinate value, an object ID, and type α of each of objects 4a1 to 4a4 in object information tables 4b and 4c shown in FIG. 3 which are stored in memory 4. At this point in time, the pixel transformation matrix column of object information table 4c is empty.

Copy image processing unit 52 reads image data 4a stored in memory 4, adjusts image data 4a to be optimum data for copying in accordance with determined type α inputted from object extraction unit 51, and writes optimum image data 4a to memory 4 again. Specifically, copy image processing unit 52 performs general copy image processing such as text enhancement, descreening, contrast adjustment, and user color adjustment. Lastly, copy image processing unit 52 transforms image data 4a into data expressed by using 256 tones in a CMYK color space and overwrites the obtained data to image data 4a in memory 4. Note that, at this time, image data 4a needs to be separated into text regions and image regions for the text enhancement and the descreening. Here, the results are used of the object extraction performed by object extraction unit 51.

For each object in image data 4a, pixel-transformation-matrix generator 53 generates a pixel transformation matrix in such a manner as to select one of three correction functions 53a0, 53a1, and 53a2 in pixel-value-correction-function table 53a shown in FIG. 4 based on the remaining-amount information LTC outputted by developer remaining-amount sensor 6 and the type α stored in object information table 4c. The pixel transformation matrix thus generated is stored in the pixel transformation matrix column of object information table 4c shown in FIG. 3B.

Pixel-value transformer 54 reads image data 4a from memory 4 and object IDs and pixel transformation matrices from object information table 4c. Then, for each object in image data 4a, pixel-value transformer 54 transforms first pixel value X of each color into second pixel value Y indicating a use amount of the color of the corresponding developer, based on the corresponding pixel transformation matrix. Pixel-value transformer 54 then outputs second pixel value Y to image formation unit 7.

Binarization unit 7a in image formation unit 7 binarizes image data 4a on which pixel-value transformer 54 performs the pixel value transformation, by such a method as line dithering or error diffusion on image. Then, printer engine 7b prints binarized image data 4a on a recording medium such as paper.

(II) Method of Generating the Pixel Transformation Matrix

How pixel-transformation-matrix generator 53 in FIG. 1 generates a pixel transformation matrix is next described with reference to FIGS. 2 to 4.

Pixel transformation matrix |A| is a matrix for transforming first pixel value X, which indicates the density of each color of each of the objects included in image data 4a, into second pixel value Y, which indicates a use amount of the color of the corresponding developer. The pixel transformation matrix |A| is generated based on the type α determined by object extraction unit 51 and remaining-amount information LTC sensed by developer remaining-amount sensor 6.

Specifically, a pixel transformation matrix is formed by a determinant having four rows and four columns. Elements Aij in the determinant, where i≠j (i=1, 2, 3 or 4 and j=1, 2, 3 or 4), take a value of 0, while elements A11, A22, A33, A44 (diagonal elements), where i=j, have four transformation coefficients Ac, Am, Ay, and Ak for the four colors of CMYK, respectively. That is, the pixel transformation matrix is expressed by the following determinant (1):

$$|A| = \begin{vmatrix} Ac & 0 & 0 & 0 \\ 0 & Am & 0 & 0 \\ 0 & 0 & Ay & 0 \\ 0 & 0 & 0 & Ak \end{vmatrix}. \quad (1)$$

Further, according to the determinant (1), a pixel-value transformation for transforming first pixel values X (Xc, Xm, Xy, and Xk) into second pixel values Y (Yc, Ym, Yy, and Yk) of the colors to be used after the transformation is expressed by the following determinant (2) representing a product of two matrices:

$$\begin{vmatrix} Yc \\ Ym \\ Yy \\ Yk \end{vmatrix} = \begin{vmatrix} Ac & 0 & 0 & 0 \\ 0 & Am & 0 & 0 \\ 0 & 0 & Ay & 0 \\ 0 & 0 & 0 & Ak \end{vmatrix} \times \begin{vmatrix} Xc \\ Xm \\ Xy \\ Xk \end{vmatrix}. \quad (2)$$

As seen from the determinant (2), first pixel values X and second pixel values Y of the colors have a relation that Yc=Ac×Xc, Ym=Am×Xm, Yy=Ay×Xy, and Yk=Ak×Xk. By using the 4×4 pixel transformation matrix |A| shown in the determinant (1), inputted first pixel values X (Xc, Xm, Xy, and Xk) of the respective colors are transformed into second pixel values Y (Yc, Ym, Yy, and Yk) indicating the use amounts of the colors of the developers. Here, pixel-transformation-matrix generator 53 has pixel-value-correction-function tables 53*a* one of which is shown in FIG. 4, and which each beforehand stores the pixel value correction functions having the three types of slope coefficients.

In the method of generating the pixel transformation matrix, pixel transformation matrix |A| is generated in the following manner. Based on the type α extracted by object extraction unit 51 and remaining-amount information LTC sensed by developer remaining-amount sensor 6, one of the three types of pixel-value correction functions 53*a*0, 53*a*1, and 53*a*2 which are stored beforehand in each of pixel-value-correction-function tables 53*a* is selected for each of the colors of CMYK. Then, the slope coefficient of 1, 1/m or 1/n of the selected correction functions 53*a*0, 53*a*1 or 53*a*2 is substituted for the corresponding transformation coefficient (Ac, Am, Ay or Ak) in the determinant (1).

Firstly, consider the case where a small-amount-developer color, which is a color of a developer having a small remaining amount, is not present according to remaining-amount information LTC sensed by developer remaining-amount sensor 6. In this case, the pixel value transformation is not required, and thus the non-correction function 53*a*0 having the slope coefficient of 1 is applied to each color. That is, (1, 1, 1, and 1) are applied to the transformation coefficients (Ac, Am, Ay, and Ak). Pixel transformation matrix |A$_0$| at this time is obtained in accordance with the following determinant (3):

$$|A_0| = \begin{vmatrix} 1 & 0 & 0 & 0 \\ 0 & 1 & 0 & 0 \\ 0 & 0 & 1 & 0 \\ 0 & 0 & 0 & 1 \end{vmatrix}. \quad (3)$$

Next, in the case where the small-amount-developer color is present according to remaining-amount information LTC sensed by developer remaining-amount sensor 6, one of the slope coefficients is selected based on type α of the corresponding object extracted by object extraction unit 51. When type α of the object is "image", the slope coefficient of 1/m representing low-density correction function 53*a*1 is selected for a developer color corresponding to the small-amount-developer color, and the slope coefficient of 1/n representing middle-density correction function 53*a*2 is selected for colors corresponding to the other developer colors.

For example, when the small-amount-developer color is cyan (C), the transformation coefficients of each of "image" objects 4*a*3 and 4*a*4 are (Ac, Am, Ay, and Ak)=(1/m, 1/n, 1/n, and 1/n). Accordingly, pixel transformation matrix |A$_1$| at this time is the following determinant (4):

$$|A_1| = \begin{vmatrix} 1/m & 0 & 0 & 0 \\ 0 & 1/n & 0 & 0 \\ 0 & 0 & 1/n & 0 \\ 0 & 0 & 0 & 1/n \end{vmatrix}. \quad (4)$$

When type α of an object is "text", low-density correction function 53*a*1 having the slope coefficient of 1/m is selected for a color component corresponding to the small-amount-developer color, and non-correction function 53*a*0 having the slope coefficient of 1 is selected for color components corresponding to the other developer colors. For example, when the small-amount-developer color is cyan, the transformation coefficients of the text object are (Ac, Am, Ay, and Ak)=(1/m, 1, 1, and 1). Accordingly, pixel transformation matrix |A$_2$| at this time is the following determinant (5):

$$|A_2| = \begin{vmatrix} 1/m & 0 & 0 & 0 \\ 0 & 1 & 0 & 0 \\ 0 & 0 & 1 & 0 \\ 0 & 0 & 0 & 1 \end{vmatrix}. \quad (5)$$

When the small-amount-developer color is not present, an amount of each developer does not have to be restricted. Thus, pixel transformation matrix |A$_0$| in the determinant (3) is applied to the determinant (2), and the pixel value transformation is not performed. On the other hand, when the small-amount-developer color is present, the following processing is performed depending on type α of the object. In image objects 4*a*3 and 4*a*4, pixel transformation matrix |A$_1$| in the determinant (4) is applied to the determinant (2). By reducing the use amount of a developer of the color corresponding to the small-amount-developer color and by slightly reducing the densities of the color components corresponding to the other developer colors, it is possible to prevent the hue of an image from being drastically changed while restricting the use amount of the small-amount-developer color. In contrast in text objects 4*a*1 and 4*a*2, when the small-amount-developer color is present, pixel transformation matrix |A$_2$| in the determinant (5) is applied to the determinant (2). By reducing the use amount of the developer of the color corresponding to the small-amount-developer color and by omitting the pixel value transformation for the colors corresponding to the other developer colors, it is possible to maintain readability of text by preventing the density of the color of the text from being extremely reduced, while restricting the use amount of the small-amount-developer color.

(III) Image Formation Method

FIG. 5 is a flowchart showing the image formation processing performed by the image formation apparatus in FIG. 1.

With reference to FIGS. 1 to 4, the image formation method in Embodiment 1 is described based on FIG. 5. Upon the start of the processing, in Step S1 receiver 2 receives the image data read by scanner 1 and expressed using the RGB color space. Then, the processing proceeds to Step S2. In Step S2, image preprocessing unit 3 transforms the received RGB image data into an image expressed using the 256 tones in the YCbCr color space and stores image data 4*a* thus transformed and expressed using the 256 tones in the YCbCr color space in memory 4. Then, the processing proceeds to Step S3.

In Step S3, object extraction unit 51 performs the region separation on image data 4*a* expressed using the 256 tones in the YCbCr color space by image preprocessing unit 3, and determines type α for each object, type α being one of two types of "text" and "image". Each determination result including an object ID assigned to the corresponding object is stored in object information tables 4b and 4c. Then, the processing proceeds to Step S4. Note that pixel transformation matrix |A| in object information table 4c is empty at this point in time.

In Step S4, copy image processing unit 52 performs image processing optimum for copying on image data 4a expressed by image preprocessing unit 3 by using the 256 tones in the YCbCr color space. Specifically, copy image processing unit 52 performs general image processing such as text enhancement, descreening, contrast adjustment, and user color adjustment, and lastly transforms image data 4a into data expressed by using the 256 tones in the CMYK color space. Then, the processing proceeds to Step S5. In Step S5, pixel-transformation-matrix generator 53 declares a variable i (i=1, 2, 3 . . . ), sets the variable i to 1. Then, the processing proceeds to Step S6.

In Step S6, pixel-transformation-matrix generator 53 generates pixel transformation matrix |A| for an object indicated by an object ID i and stores the generated pixel transformation matrix |A| in the pixel transformation matrix column of object information table 4c. Then, the processing proceeds to Step S7.

In Step S7, the variable i is incremented by 1, and then the processing proceeds to Step S8. In Step S8, it is judged whether or not the variable i is larger than the total number of objects extracted by object extraction unit 51. If the variable i is larger (Y), the processing proceeds to Step S9. If not (N), the processing moves back to Step S6.

In Step S9, pixel-value transformer 54 applies pixel transformation matrix |A| stored in the pixel transformation matrix column of object information table 4c to each of objects 4a1 to 4a4 which are included in image data 4a and expressed by using the 256 tones in the CMYK space by copy image processing unit 52. Pixel-value transformer 54 thereby transforms first pixel values X in each object into second pixel values Y by using the determinant (2), and then the processing proceeds to Step S10. Specifically, copy image processing unit 52 scans all of the coordinates of image data 4a to refer to object IDs associated with the objects of image data 9a in object information tables 4b and 4c. Then, pixel-value transformer 54 performs the pixel value transformation by referring to pixel transformation matrix |A| associated with the object ID i in object information tables 4b and 4c.

In Step S10, image formation unit 7 binarizes the multiple-valued image data in the CMYK color space generated by the pixel value transformation by pixel-value transformer 54. Then, the processing proceeds to Step S11. As a binarization method, either the line dithering or the error diffusion is employed. In Step S11, image formation unit 7 causes printer engine 7b to form an image of the data binarized in Step S10 on a recording medium such as paper. Then, the processing is terminated.

Figure 6:
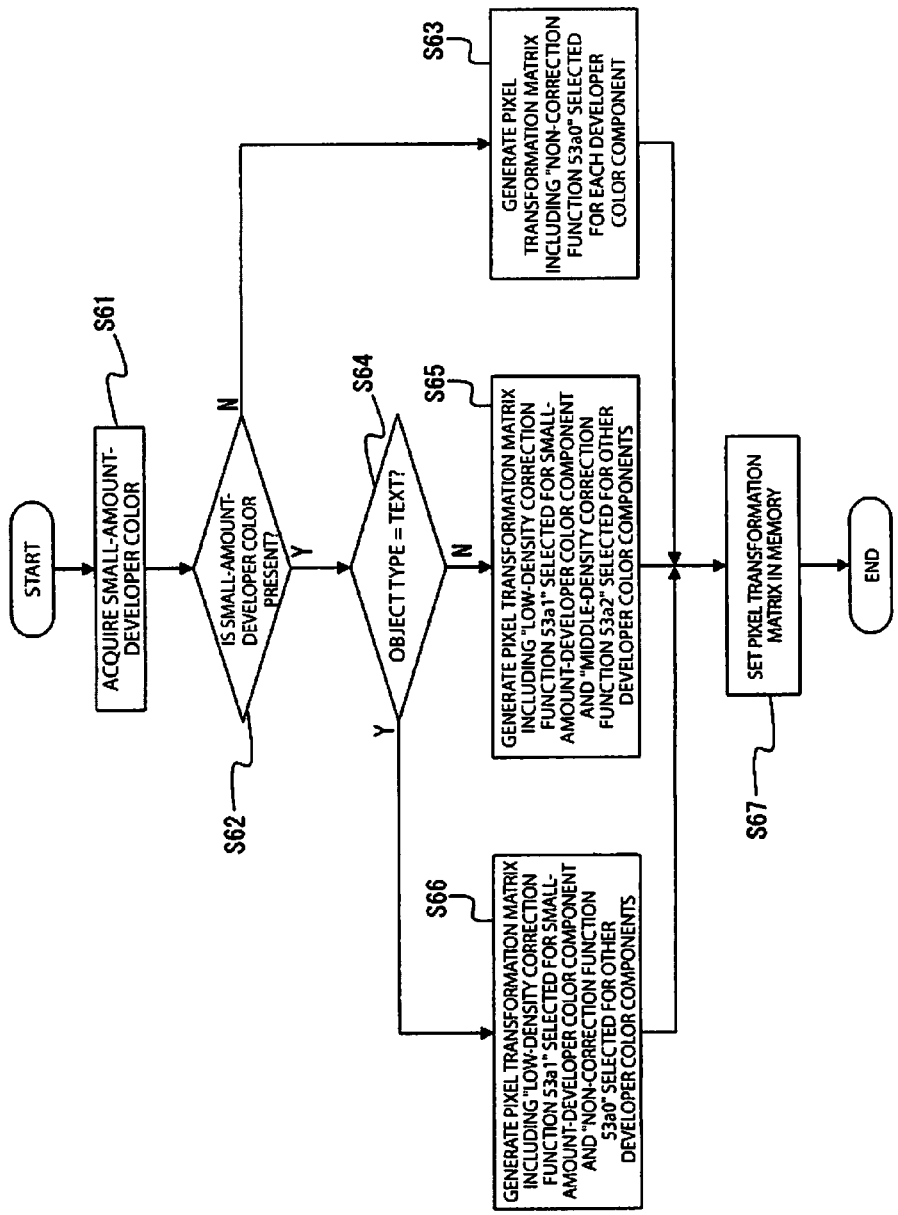
FIG. 6 is a flowchart showing the pixel-transformation-matrix generation processing in Step S6 in FIG. 5.

FIG. 6 is a flowchart showing pixel-transformation-matrix generation processing in Step S6 in FIG. 5.

Upon completion of the processing in Step S5 in FIG. 5, the processing in Step S6 is started and proceeds to Step S61 in FIG. 6. In Step S61, developer remaining-amount sensor 6 acquires remaining-amount information LTC, and then the processing proceeds to Step S62. Here, a developer color having a developer remaining amount equal to or smaller than a predetermined value is judged as a small-amount-developer color. When a developer color is judged as the small-amount-developer color, at least one of cyan (C), magenta (M), yellow (Y), and black (K) is written in remaining-amount information LTC. For example, in the case of remaining-amount information LTC='CY', cyan (C) and yellow (Y) are the small-amount-developer colors.

In Step S62, pixel-transformation-matrix generator 53 judges whether or not a small-amount-developer color is present. In other words, pixel-transformation-matrix generator 53 judges whether or not any character is substituted in remaining-amount information LTC. If a character is substituted, it is judged that a small-amount-developer color is present. If the small-amount-developer color is present (Y), the processing proceeds to Step S64. If the small-amount-developer color is not present (N), the processing proceeds to Step S63.

In Step S63, pixel-transformation-matrix generator 53 generates pixel transformation matrix $|A_0|$ in the determinant (3) in such a manner as to select non-correction function 53a0 for the transformation coefficient of each color. Specifically, pixel-transformation-matrix generator 53 selects (1, 1, 1, and 1) as the transformation coefficients (Ac, Am, Ay, and Ak), so that pixel transformation matrix $|A_0|$ in the determinant (3) is generated. Then, the processing proceeds to Step S67.

In Step S64, pixel-transformation-matrix generator 53 judges whether or not type α of the object having the currently focused object ID i (ID1, ID2, ID3 or ID4) is text. If type a of the object is text (Y), the processing proceeds to Step S66. If type α of the object is not text (N), the processing proceeds to Step S65.

In Step S65, pixel-transformation-matrix generator 53 generates pixel transformation matrix |A| in such a manner as to select low-density correction function 53a1 for a color corresponding to the small-amount-developer color and middle-density correction function 53a2 for the other colors based on remaining-amount information LTC acquired in Step S61. For example, in the case of remaining-amount information LTC='CY', (1/m, 1/n, 1/m, and 1/n) are selected as the transformation coefficients (Ac, Am, Ay, and Ak) forming pixel transformation matrix |A|, so that pixel transformation matrix $|A_1|$ as in the determinant (4) is generated. Then, the processing proceeds to Step S67.

In Step S66, pixel-transformation-matrix generator 53 generates pixel transformation matrix |A| in such a manner as to select low-density correction function 53a1 for the color corresponding to the small-amount-developer color and non-correction function 53a0 for the other colors based on remaining-amount information LTC acquired in Step S61. For example, in the case of remaining-amount information LTC='CY', pixel-transformation-matrix generator 53 selects (1/m, 1, 1/m, and 1) as the transformation coefficients (Ac, Am, Ay, and Ak) forming pixel transformation matrix |A|, so that pixel transformation matrix $|A_2|$ as in the determinant (5) is generated. Then, the processing proceeds to Step S67.

In Step S67, pixel-transformation-matrix generator 53 sets pixel transformation matrix $|A_i|$ generated in Step S64, S65 or S66 in the pixel transformation matrix column of object information table 4c in memory 4 in association with the object ID, and terminates the processing in FIG. 6. Then, the processing proceeds to Step S7 in FIG. 5. Thereafter, in the processing in Steps S7 to S11 as described above, the image is formed on the recording medium in accordance with an amount of each color developer for which the pixel value transformation is executed in accordance with the determinant (2) using pixel transformation matrix |A|. Then, the processing is terminated.

(Advantageous Effects of Embodiment 1)

The image formation method and the image formation apparatus in Embodiment 1 provide the following advantageous effects (a) and (b).

(a) The image formation apparatus includes object extraction unit 51, developer remaining-amount sensor 6, and pixel-transformation-matrix generator 53. When any of the colors of developers having a small remaining amount is sensed, the image formation apparatus reduces, for an image object, a use amount of the small-developer-amount color and also slightly reduces use amounts of the other developer colors. This makes it possible to prevent the hue of an image from being drastically changed while reducing a use amount of the small-developer-amount color.

(b) The image formation apparatus includes object extraction unit 51, developer remaining-amount sensor 6, and pixel-transformation-matrix generator 53. When any of the colors of the developers having a small remaining amount is sensed, the image formation apparatus reduces, for a text object, a use amount of the small-developer-amount color and does not perform pixel value transformation on the other developer colors. This makes it possible to maintain a readability of the text by preventing the density of the color of the text from being extremely reduced, while reducing the use amount of the small-amount-developer color.

[Embodiment 2]
(Configuration in Embodiment 2)

Figure 7:
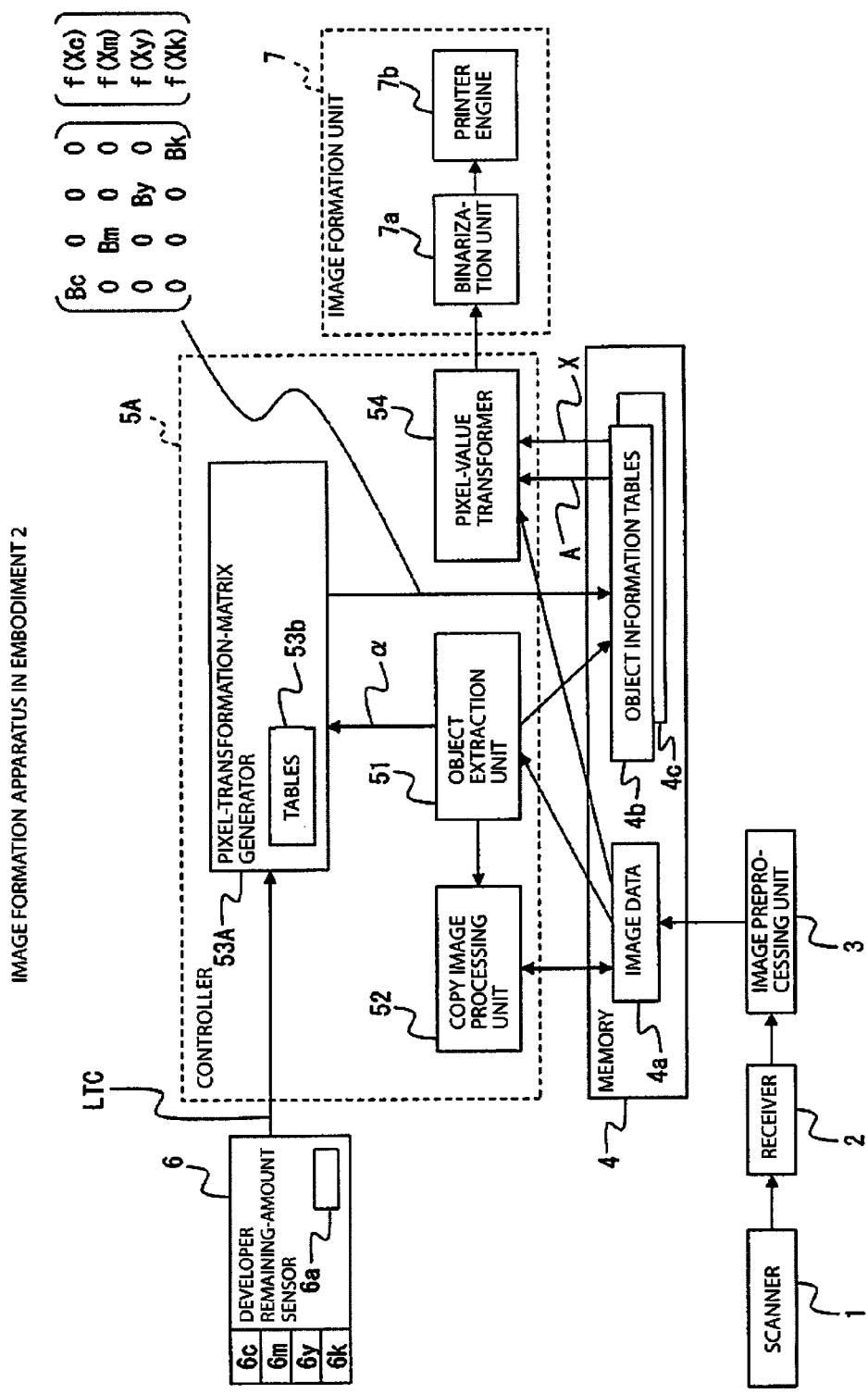
FIG. 7 is a block diagram showing a schematic configuration of an image formation apparatus in Embodiment 2 of the invention.

FIG. 7 is a block diagram showing a schematic configuration of an image formation apparatus in Embodiment 2 of the invention. Components common to those in Embodiment 1 are denoted by common reference numerals.

An image formation apparatus in Embodiment 2 includes: controller 5A having a configuration different from that of the image formation apparatus in Embodiment 1; and scanner 1, receiver 2, image preprocessing unit 3, memory 4, developer remaining-amount sensor 6, and image formation unit 7 which have the same configuration as that in Embodiment 1.

Controller 5A in Embodiment 2 includes: pixel-transformation-matrix generator 53A having a configuration different from that of pixel-transformation-matrix generator 53 in Embodiment 1; and object extraction unit 51, copy image processing unit 52, and pixel-value transformer 54 having the same configuration as that in Embodiment 1.

Pixel-transformation-matrix generator 53A in Embodiment 2 stores pixel-value-correction-function tables 53b instead of pixel-value-correction-function tables 53a in Embodiment 1. Pixel-value-correction-function tables 53b each have a configuration different from that in Embodiment 1. The other components of pixel-transformation-matrix generator 53A have the same configuration as that in Embodiment 1.

Figure 8:
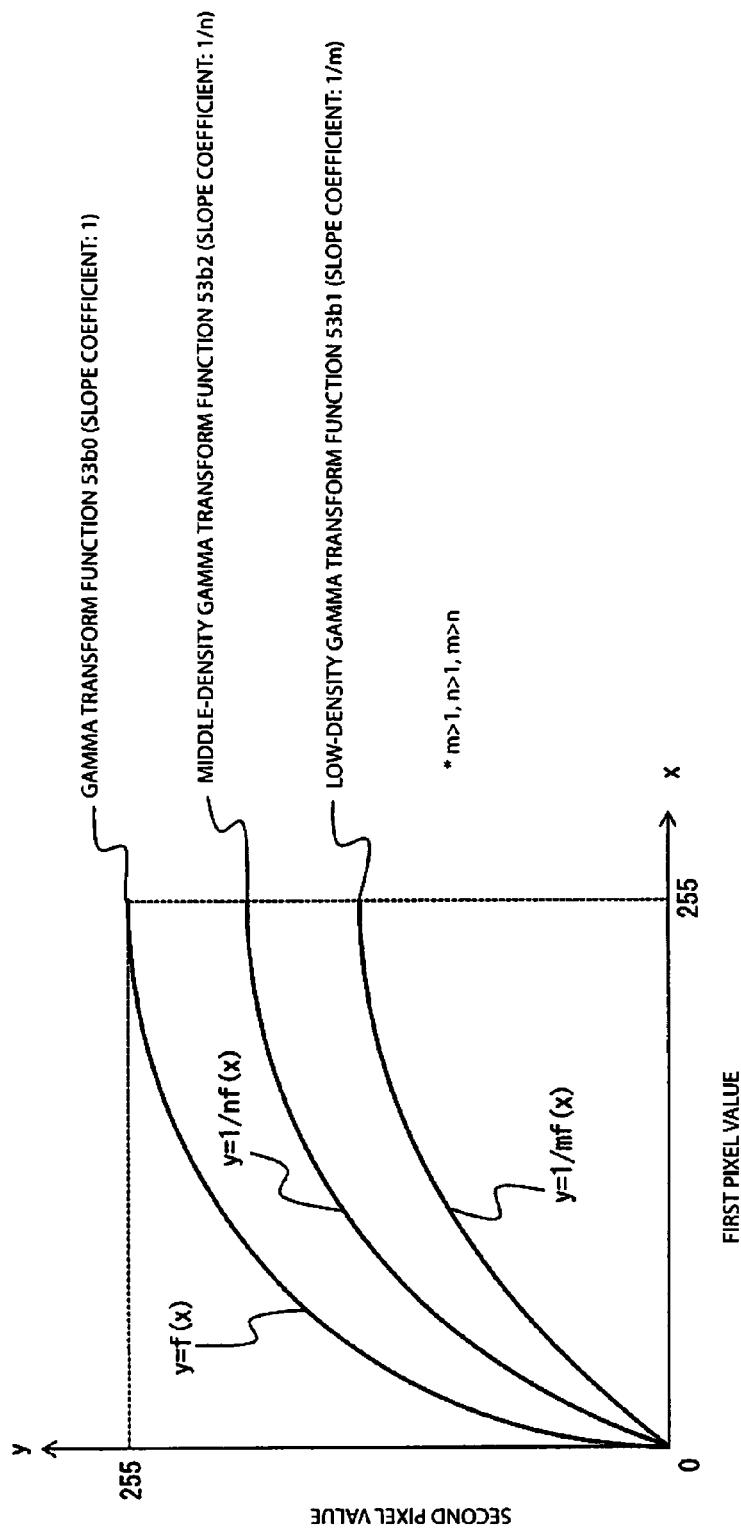
FIG. 8 is a graph showing an example of pixel-value-correction-function table 53b in FIG. 7.

FIG. 8 is a graph showing an example of one of pixel-value-correction-function tables 53b in FIG. 7. The x axis in the horizontal direction represents first pixel value X in the range from 0 to 255, while the axis y in the vertical direction represents second pixel value Y in the range from 0 to 255. FIG. 8 shows one of pixel-value-correction-function tables 53b for a particular color, for example, cyan (C). Each pixel-value-correction-function table 53b is stored in pixel-transformation-matrix generator 53A and three types of slope coefficients are applied thereto. Since each color is based on the 256 tones, the pixel values on the x and y axes range from 0 to 255.

In FIG. 8, gamma transform function 53b0 is a gamma transform function having a slope coefficient of 1 and exhibits an upward-convex curve extending from the origin (0, 0) of the xy coordinates to coordinates (255, 255). A gamma transform function f(X) is expressed by the following formula (6):

$$f(X/255)=255\times(X/255)^{1/\gamma}\text{(where }\gamma>1) \tag{6}$$

The formula (6) is a gamma transformation including a γ value adjusted based on a binarization (dithering) characteristic of an image formation unit and density characteristics of the developers so that an image subjected to the image preprocessing can be formed in a natural color.

Low-density gamma transform function 53b1 is obtained by multiplying gamma transform function 53b0 by a slope coefficient of 1/m and exhibits an upward-convex curve extending from the origin (0, 0) of the xy coordinates to coordinates (255, 255/m). Second pixel value Y in low-density gamma transform function 53b1 is smaller than second pixel value Y in gamma transform function 53b0. Middle-density gamma transform function 53b2 is obtained by multiplying gamma transform function 53b0 by a slope coefficient of 1/n and exhibits an upward-convex curve extending from the origin (0, 0) of the XY coordinates to coordinates (255, 255/n). Second pixel value Y in middle-density gamma transform function 53b2 is smaller than second pixel value Y in gamma transform function 53b0, but is larger than second pixel value Y in low-density gamma transform function 53b1. In other words, m and n are larger than 1, and m is larger than n.

Figure 9:
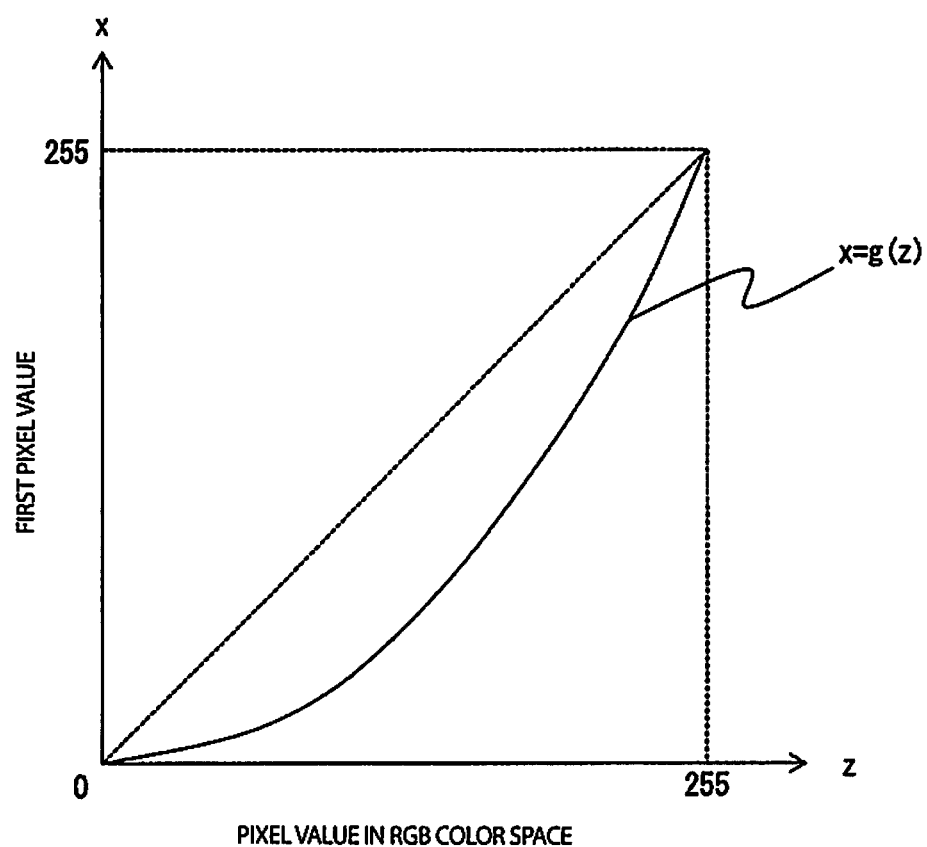
FIG. 9 is a graph showing a characteristic of pixel value transformation from an RGB color space to a YCbCr color space by image preprocessing unit 3 in FIG. 7.

FIG. 9 is a graph showing a characteristic of the pixel value transformation from the RGB color space to the YCbCr color space performed by image preprocessing unit 3 in FIG. 7.

The z axis in the horizontal direction represents pixel value Z in the range from 0 to 255 in the RGB color space, while the x axis in the vertical direction represents first pixel value X in the range from 0 to 255.

In FIG. 9, the characteristic of the transformation from pixel value Z in the RGB color space to first pixel value X exhibits a downward-convex curve extending from the origin of the zx coordinates to coordinates (255, 255).

It is found from FIG. 9 that pixel value Z in the RGB color space read by scanner 1 is transformed into first pixel value X in the YCbCr color space in a distorted manner.

Here, a transformation characteristic g (Z) in FIG. 9 is expressed by the following formula (7):

$$g(Z/255)=255\times(Z/255)^{\gamma} \tag{7}$$

The formula (7), however, is a gamma transformation including a γ value suitable for the image preprocessing and the copy image processing (for example, easy to perform the image region separation) on a received image received. In addition, Embodiment 2 uses the pixel-value-correction-function table 53b shown in FIG. 8 instead of the pixel-value-correction-function table 53a in FIG. 4.

(Operation in Embodiment 2)

An overall operation of the image formation apparatus in Embodiment 2 is the same as in (I) of Embodiment 1: Overall operation of the image formation apparatus. Thus for Embodiment 2, descriptions are given of (I) Method of generating the pixel transformation matrix and (II) Detailed operation in the image formation method.

(I) Method of Generating the Pixel Transformation Matrix

How pixel-transformation-matrix generator 53A in FIG. 7 generates a pixel transformation matrix is described with reference to FIG. 8.

Pixel transformation matrix |B| in Embodiment 2 is formed by four rows and four columns like pixel transformation matrix |A| in Embodiment 1. Elements Bij (i=1, 2, 3 or 4 and j=1, 2, 3 or 4) where i≠j in the determinant take a value of 0, while elements B11, B22, B33, B44 (diagonal elements) where i=j have four transformation coefficients Bc, Bm, By, and Bk for the four colors of CMYK, respectively. That is, the pixel transformation matrix is expressed by the following determinant (8):

$$|B| = \begin{vmatrix} Bc & 0 & 0 & 0 \\ 0 & Bm & 0 & 0 \\ 0 & 0 & By & 0 \\ 0 & 0 & 0 & Bk \end{vmatrix}. \qquad (8)$$

Further, according to the determinant (18), a pixel-value transformation for transforming first pixel values X (Xc, Xm, Xy, and Xk) into second pixel values Y (Yc, Ym, Yy, and Yk) of the colors to be used after the transformation is expressed by the following determinant (9) representing a product of two matrices:

$$\begin{vmatrix} Yc \\ Ym \\ Yy \\ Yk \end{vmatrix} = \begin{vmatrix} Bc & 0 & 0 & 0 \\ 0 & Bm & 0 & 0 \\ 0 & 0 & By & 0 \\ 0 & 0 & 0 & Bk \end{vmatrix} \times \begin{vmatrix} f(Xc) \\ f(Xm) \\ f(Xy) \\ f(Xk) \end{vmatrix}. \qquad (9)$$

The gamma transform function f(X) in the determinant (9) is the gamma transform function having γ>1 in the formula (6) described above. The reason why Embodiment 2 uses the gamma transform functions as the pixel value correction functions is to increase the density of a color to prevent the color of a low-density portion from becoming faint after the pixel value transformation.

As seen from the formula (6) and the determinants (8) and (9), first pixel values X (Xc, Xm, Xy, and Xk) and second pixel values Y (Yc, Ym, Yy, and Yk) of the colors have a relation that Yc=Bc×f(Xc), Ym=Bm×f(Xm), Yy=By×f(Xy), and Yk=Bk×f(xk). By using the 4×4 pixel transformation matrix |B| shown in the determinant (8) and the gamma transform function shown in the determinant (9), inputted first pixel values X (Xc, Xm, Xy, and Xk) of the respective colors are transformed into second pixel values Y (Yc, Ym, Yy, and Yk) indicating the use amounts of the colors of the developers.

In the method of generating the pixel transformation matrix, pixel transformation matrix |B| is generated in the following manner. Based on type α extracted by object extraction unit 51 and remaining-amount information LTC sensed by developer remaining-amount sensor 6, one of gamma transform functions 53*b*0 to 53*b*2 is selected for each of the colors of CMYK. Gamma transform functions 53*b*0 to 53*b*2 have the three types of slope coefficients, respectively, and are stored in each of pixel-value-correction-function tables 53*b* in pixel-transformation-matrix generator 53A shown in FIG. 8. Then, a selected one of the gamma transform functions 53*b*0 to 53*b*2 is substituted for the corresponding transformation coefficient (Bc, Bm, By or Bk).

Firstly, consider the case where a small-amount-developer color is not present according to remaining-amount information LTC sensed by developer remaining-amount sensor 6. In this case, the pixel value transformation is not required, and thus gamma transform function 53*b*0 having the slope coefficient of 1 is applied to each color component. That is, (1, 1, 1, and 1) are selected as the transformation coefficients (Bc, Bm, By, and Bk). A pixel-value transformation from first pixel values X (Xc, Xm, Xy, and Xk) to second pixel values Y (Yc, Ym, Yy, and Yk) is obtained by the following determinant (10):

$$\begin{vmatrix} Yc \\ Ym \\ Yy \\ Yk \end{vmatrix} = \begin{vmatrix} 1 & 0 & 0 & 0 \\ 0 & 1 & 0 & 0 \\ 0 & 0 & 1 & 0 \\ 0 & 0 & 0 & 1 \end{vmatrix} \times \begin{vmatrix} f(Xc) \\ f(Xm) \\ f(Xy) \\ f(Xk) \end{vmatrix}. \qquad (10)$$

In other words, when the small-amount-developer color is not present, the pixel value transformation is performed from first pixel values X (Xc, Xm, Xy, and Xk) to second pixel values Y (Yc, Ym, Yy, and Yk) for each color by using gamma transform function 53*b*0 in FIG. 8.

Next, in the case where the small-amount-developer color is present according to remaining-amount information LTC sensed by developer remaining-amount sensor 6, one of the slope coefficients is selected based on type α of the corresponding object extracted by object extraction unit 51.

When type α of the object is "image", the slope coefficient of 1/m representing low-density gamma transform function 53*b*1 is selected for a developer color corresponding to the small-amount-developer color, and the slope coefficient of 1/n representing middle-density gamma transform function 53*b*2 is selected for the other developer colors. For example, when the small-amount-developer color is cyan (C) and type α of the object is "image", (1/m, 1/n, 1/n, 1/n) are selected as the transformation coefficients (Bc, Bm, By, and Bk). A pixel-value transformation from first pixel values X (Xc, Xm, Xy, and Xk) to second pixel values Y (Yc, Ym, Yy, and Yk) at this time is obtained by the following determinant (11):

$$\begin{vmatrix} Yc \\ Ym \\ Yy \\ Yk \end{vmatrix} = \begin{vmatrix} 1/m & 0 & 0 & 0 \\ 0 & 1/n & 0 & 0 \\ 0 & 0 & 1/n & 0 \\ 0 & 0 & 0 & 1/n \end{vmatrix} \times \begin{vmatrix} f(Xc) \\ f(Xm) \\ f(Xy) \\ f(Xk) \end{vmatrix}. \qquad (11)$$

On the other hand, when type α of the object is "text", the slope coefficient of 1/m representing low-density gamma transform function 53*b*1 is selected for the color component corresponding to the small-amount-developer color, and the slope coefficient of 1 representing gamma transform function 53*b*0 is selected for color components corresponding to the other developer colors. For example, when the small-amount-developer color is cyan (C) and type α of the object is "text", (1/m, 1, 1, and 1) are selected as the transformation coefficients (Bc, Bm, By, and Bk). A pixel-value transformation from first pixel values X (Xc, Xm, Xy, and Xk) to second pixel values Y (Yc, Ym, Yy, and Yk) at this time is obtained by the following determinant (12):

$$\begin{vmatrix} Yc \\ Ym \\ Yy \\ Yk \end{vmatrix} = \begin{vmatrix} 1/m & 0 & 0 & 0 \\ 0 & 1 & 0 & 0 \\ 0 & 0 & 1 & 0 \\ 0 & 0 & 0 & 1 \end{vmatrix} \times \begin{vmatrix} f(Xc) \\ f(Xm) \\ f(Xy) \\ f(Xk) \end{vmatrix}. \qquad (12)$$

When the small-amount-developer color is not present, an amount of each developer does not have to be restricted. Thus, the determinant (10) is applied to the pixel value transformation from first pixel values X to second pixel values Y, so that only the pixel value transformation using gamma transform function 53*b*0 is performed.

On the other hand, when the small-amount-developer color is present, the following processing is performed depending on type α of the object. In an image object, the determinant (11), for example, is applied to the pixel value transformation from first pixel values X to second pixel values Y. By reducing the use amount of a developer of the color corresponding to the small-amount-developer color and slightly reducing the use amounts of the color components corresponding to the other developer colors, it is possible to prevent the hue of an image from being drastically changed while restricting the use amount of the small-amount-developer color. In contrast in a text object, the determinant (12), for example, is applied to the pixel value transformation from first pixel values X to second pixel values Y. By reducing the use amount of the developer of the color corresponding to the small-amount-developer color and by performing the transformation using gamma transform function 53b0 on pixel values of the colors corresponding to the other developer colors, it is possible to maintain the readability of text by preventing the density of the color from being extremely reduced, while restricting the use amount of the small-amount-developer color.

(II) Detailed Operation in the Image Formation Method

Figure 10:
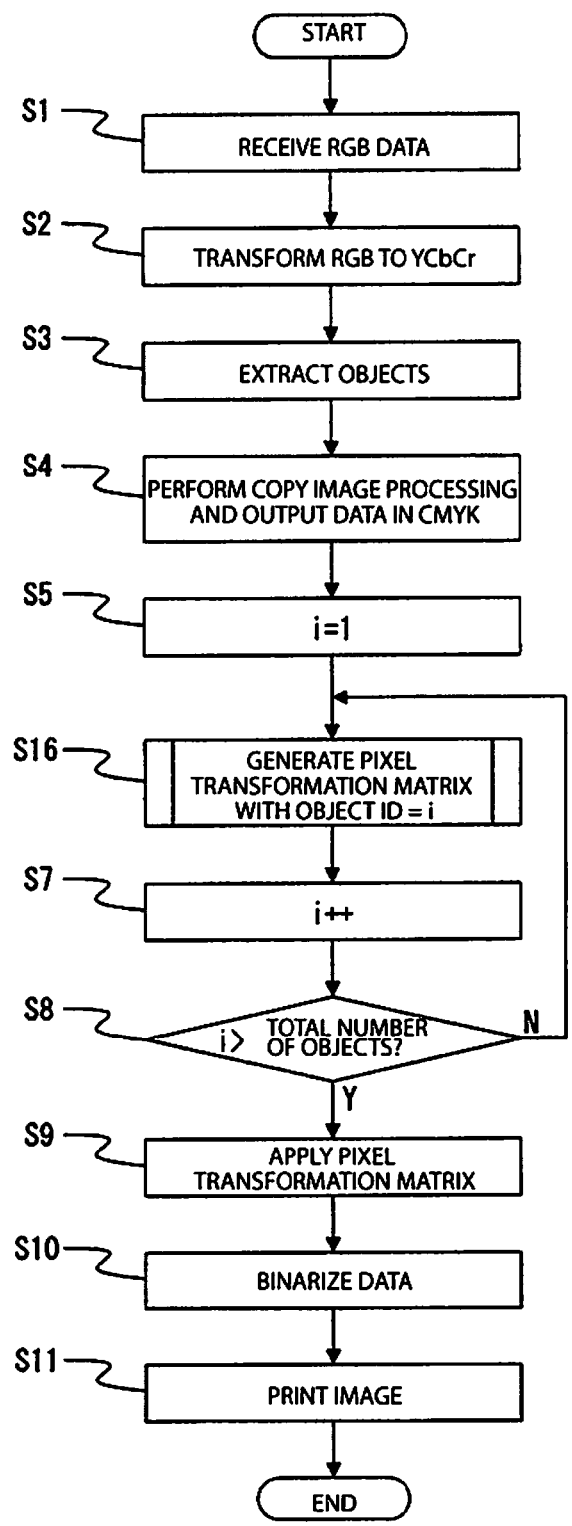
FIG. 10 is flowchart showing the image formation processing of the image formation apparatus in FIG. 7.

FIG. 10 is a flowchart showing image formation processing in the image formation apparatus in FIG. 7. Components common to those in FIG. 5 showing the image formation processing in Embodiment 1 are denoted by common reference numerals.

With reference to FIGS. 2, 3A, 3B, 5, and 8, an operation in Embodiment 2 is described based on FIG. 10.

Upon the start of the processing, the same processing as in Steps S1 to S5 in Embodiment 1 shown in FIG. 5 is performed, and then the processing proceeds to Step S16.

In Step S16, pixel-transformation-matrix generator 53A generates pixel transformation matrix |B| for an object indicated by an object ID i (i=1, 2, . . . ) and stores generated pixel transformation matrix |B| in the pixel transformation matrix column of object information table 4c. Then, the processing proceeds to Step S7.

In Step S7, the variable i is incremented by 1, and then the processing proceeds to Step S8. In Step S8, it is judged whether or not the variable i is larger than the total number of objects extracted by object extraction unit 51. If the variable i is larger (Y), the processing proceeds to Step S9. If not (N), the processing moves back to Step S16.

In Step S9, pixel-value transformer 54 applies pixel transformation matrix |B| stored in the pixel transformation matrix column of object information table 4c to image data 4a expressed by using the 256 tones in the CMYK space by copy image processing unit 52. Pixel-value transformer 54 thereby transforms first pixel values X of the respective colors of CMYK, and then the processing proceeds to Step S10. Thereafter, the same print processing as in Step S11 in Embodiment 1 shown in FIG. 5 is performed, and then the processing is terminated.

FIG. 11 is a flowchart showing the pixel-transformation-matrix generation processing in Step S16 in FIG. 10. Components common to those in FIG. 6 showing Step S6 in FIG. 5 are denoted by common reference numerals.

Upon completion of the processing in Step S5 in FIG. 10, the pixel-transformation-matrix generation processing in Step S16 is started and proceeds to Step S61 in FIG. 11. In Step S61, the same processing of acquiring a small-amount-developer color as in Embodiment 1 is performed, and then the processing proceeds to Step S62. In Step S62, pixel-transformation-matrix generator 53 judges whether or not a small-amount-developer color is present, as in Embodiment 1. If the small-amount-developer color is present (Y), the processing proceeds to Step S64. If the small-amount-developer color is not present (N), the processing proceeds to Step S71.

In Step S71, pixel-transformation-matrix generator 53A generates pixel transformation matrix |B| in such a manner as to select gamma transform function 53b0 for each color component. Specifically, pixel-transformation-matrix generator 53A applies (1, 1, 1, and 1) to the transformation coefficients (Bc, Bm, By, and Bk) forming pixel transformation matrix |B|. Pixel-transformation-matrix generator 53A selects as the pixel value correction function f(X) a gamma transform function expressed by the determinant (10), so that pixel transformation matrix |B| is generated. Then, the processing proceeds to Step S67.

In Step S69, pixel-transformation-matrix generator 53A judges whether or not type α of the object having the currently focused object ID i (i=1, 2, 3 . . . ) is text. If type α of the object is text (Y), the processing proceeds to Step S73. If type α of the object is not text (N), the processing proceeds to Step S72.

In Step S72, pixel-transformation-matrix generator 53A generates pixel transformation matrix |B| in such a manner as to select low-density gamma transform function 53b1 for a color corresponding to the small-amount-developer color and middle-density gamma transform function 53b2 for the other colors based on remaining-amount information LTC acquired in Step S61. For example, in the case of remaining-amount information LTC='CY', pixel-transformation-matrix generator 53A applies (1/m, 1/n, 1/m, and 1/n) to the transformation coefficients (Bc, Bm, By, and Bk) forming pixel transformation matrix |B|. Pixel-transformation-matrix generator 53A selects as the pixel value correction function f(X) a gamma transform function expressed by the determinant (11), so that pixel transformation matrix |B| is generated. Then, the processing proceeds to Step S67.

In Step S73, pixel-transformation-matrix generator 53A generates pixel transformation matrix |B| in such a manner as to select low-density gamma transform function 53b1 for the color corresponding to the small-amount-developer color, and gamma transform function 53b0 for the other color components based on remaining-amount information LTC acquired in Step S61. For example, remaining-amount information LTC='CY', pixel-transformation-matrix generator 53A selects (1/m, 1, 1/m, and 1) as the transformation coefficients (Bc, Bm, By, and Bk) forming pixel transformation matrix |B| and selects as the pixel value correction function f(X) the gamma transform function expressed by the determinant (12), so that pixel transformation matrix |B| is generated. Then, the processing proceeds to Step S67.

In Step S67, pixel-transformation-matrix generator 53A sets pixel transformation matrix |B| generated in Step S71, S72 or S73 in the pixel transformation matrix column of object information table 4c in memory 4, and terminates the pixel-transformation-matrix generation processing in FIG. 11. Then, the processing proceeds to Step S7 in FIG. 10. Thereafter, in the processing in Steps S7 to S11 as described above, an image is formed on the recording medium in accordance with an amount of each color developer for which the pixel value transformation is executed in accordance with the determinant (2) using pixel transformation matrix |B|.

(Advantageous effects of Embodiment 2)

Embodiment 2 provides the following advantageous effects (a) and (b) in addition to those provided by Embodiment 1.

(a) The gamma transform function expressed by the formula (6) having γ>1 is applied to the pixel value correction function. This prevents a color of a low-density portion in a print from becoming faint, and provides an advantageous effect of enhancing the readability of the print.

(b) The gamma transform function expressed by the formula (6) having γ>1 is an inverse function of the pixel value transformation characteristic expressed by the formula (7). This provides natural color change (gradation) close to that in an original image through processing by scanner 1 to image formation unit 7.

(Modification)

The invention is not limited to Embodiments 1 and 2 described above and allows for various modes of use and modifications. Examples of the modes and modifications include the following (a) to (d).

(a) Embodiments 1 and 2 are described by taking an example of a copier as an image formation apparatus. However, the invention is not limited to a copier and is applicable as well to a personal computer configured to generate and output image data 4a and to a printer device configured to generate an image for a document, perform image processing thereon, and print the image.

(b) Embodiments 1 and 2 are described on the assumption that sensing a small-amount-developer color leads to a reduction of the use amount of the corresponding developer. However, the image formation apparatus may be provided with a switch for switching whether or not to perform a reduction control over the use amount of the developer to allow a user to select whether or not to perform the reduction control.

(c) Embodiments 1 and 2 each describe the example of using the linear functions or the gamma transform functions as the pixel value correction functions for the transformation from first pixel values X to second pixel values Y. However, the pixel value correction functions are not limited to the linear functions or the gamma transform functions. The invention is applicable to pixel value correction functions experimentally obtained based on a use amount of a developer having a small remaining amount of the color, the readability of text of a printed image, and change in hue of the image.

(d) Embodiments 1 and 2 are described on the assumption that the developer colors are four colors of cyan (C), magenta (M), yellow (Y), and black (K). However, the developer colors are not limited to the four colors. The invention is applicable to an image formation apparatus using, for example, developers of four or more colors.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A method for forming an image comprising:
a data storage step of storing in a memory image data including objects, each object having information on a type and densities of colors of the object;
an object extraction step of extracting each of the objects and the type of the object, each object included in the image data stored in the memory, and including first pixel values indicating the densities of the colors of the object;
a matrix generation step of acquiring remaining-amount information indicating a color of a developer having a small remaining amount among colors of respective developers for image formation, and then generating, based on the remaining-amount information and the type of the object, a pixel transformation matrix for transforming the first pixel values into second pixel values indicating use amounts of the colors of the developers;
a pixel value transformation step of transforming the first pixel values into the second pixel values for the respective colors of the developers based on the pixel transformation matrix; and
an image formation step of forming images of the respective objects included in the image data based on the use amounts of the developers corresponding to the second pixel values transformed in the pixel value transformation step, wherein
the steps are executed in the above cited order.

2. The image formation method according to claim 1, wherein
the generating of the pixel transformation matrix includes forming an n-th order determinant, wherein n is a natural number, in which elements each having unequal numbers as a row number and a column number take on a value of 0, and elements on a main diagonal each having an equal number as the row number and the column number have transformation coefficients for the respective colors, and
the elements on the main diagonal are determined based on a type of each of the objects included in the image data and the remaining-amount information indicating the color of the developer having the small remaining amount among the colors of the respective developers.

3. An image formation apparatus comprising:
a memory configured to store image data including objects each having information on a type and densities of colors of the object;
a developer-remaining-amount sensor configured to sense and output remaining-amount information indicating a color of a developer having a small remaining amount among colors of respective developers for image formation;
a controller configured to transform first pixel values of the densities of the colors of each object included in the image data stored in the memory into second pixel values indicating use amounts of the colors of the developers, for each object based on a type of the object and the remaining-amount information; and
an image formation unit configured to form images on a recording medium for the objects included in the image data by using the developers in accordance with use amounts of the developers corresponding to the second pixel values transformed by the controller,
wherein the controller includes:
an object extraction unit configured to extract the type of each of the object included in the image data stored in the memory;
a pixel-transformation-matrix generator configured to generate a pixel transformation matrix for each object based on the type and the remaining-amount information, the pixel transformation matrix being for transforming the first pixel values into the second pixel values; and
a pixel-value transformer configured to transform the first pixel values of each object into the second pixel values based on the pixel transformation matrix,
wherein the object each have an identification number, and
wherein the object extraction unit is configured to extract from the image data stored in the memory, the identification number of each object having the first pixel values and the type of the object based on the identification number.

4. The image formation apparatus according to claim 3, wherein
the image formation unit further includes a binarization unit configured to binarize images each having the second pixel values transformed.

5. The image formation apparatus according to claim 3, wherein
the type is classified into an image object and other objects including a text object, and
the pixel-transformation-matrix generator is configured to generate a first pixel transformation matrix when the type extracted by the object extraction unit is the image object, and
generate a second pixel transformation matrix when the type is any of the other objects.

6. The image formation apparatus according to claim 3, wherein
the pixel transformation matrix is an n-th order determinant, wherein n is a natural number, in which elements each having unequal numbers as the row number and the column number take on a value of 0, and diagonal elements each having an equal number as the row number and the column number have transformation coefficients for the respective colors, and
the pixel-transformation-matrix generator is configured to generate the pixel transformation matrix when the developer-remaining-amount sensor senses the color of the developer having the small remaining amount among the colors of the developers, wherein one of pixel value correction functions is selected for each of the diagonal elements.

7. The image formation apparatus according to claim 6, wherein
the pixel value correction functions are functions having slope coefficients of 1, 1/n, and 1/m, wherein m>n>0, respectively.

8. The image formation apparatus according to claim 6, wherein
each of the pixel value correction functions is a function of
a product of
a slope coefficient of 1, 1/n or 1/m, wherein m>n>0, and
a gamma transform function f(X/the number of tones)=the number of tones×(X/the number of tones)$^{1/\gamma}$, wherein $\gamma>1$.

9. The image formation apparatus according to claim 3, wherein
when the pixel-value transformer performs pixel value transformation of the first pixel values into the second pixel values for any one of the colors by using a first pixel value correction function, a density of a color in an image formed by the image formation unit is 1/m times the density of the color in an image formed without the pixel value transformation, wherein m>1; and
when the pixel-value transformer performs the pixel value transformation for any one of the colors by using a second pixel value correction function, the density of the color in an image formed by the image formation unit is 1/n times the density of the color in an image formed without the pixel value transformation, wherein m>n>1.

10. The image formation apparatus according to claim 3, wherein
when any one of the remaining amounts of the colors of developers sensed by the developer-remaining-amount sensor is smaller than a predetermined remaining amount, the pixel-transformation-matrix generator is configured to generate the pixel transformation matrix for a text object by selecting a first pixel value correction function f(X)/m having a slope coefficient of 1/m for the color of the developer having the remaining amount smaller than the predetermined remaining amount, and by selecting a pixel value correction function having a slope coefficient of 1 for the other colors of the developers.

11. The image formation apparatus according to claim 10, wherein
when the pixel-value transformer performs the pixel value transformation by applying the first pixel value correction function f(X)/m, wherein m>1, the density of the color in an image formed by the image formation unit is 1/m times the density of the color in an image formed without performing the pixel value transformation, wherein m>1.

12. An image formation apparatus comprising:
a memory configured to store image data including objects each having information on a type and densities of colors of the object;
an object extraction unit configured to extract each of the objects included in the image data stored in the memory and the type of the object including first pixel values indicating the densities of the colors of the object; and
a pixel-value transformer configured to transform the first pixel values of the type of each object extracted by the object extraction unit into second pixel values indicating use amounts of the colors of the developers, based on remaining-amount information indicating a color of a developer having a small remaining amount among the colors of the developers, wherein
as objects whose images are to be formed by using the use amounts of the developers corresponding to the second pixel values transformed by the pixel-value transformer, a text object and at least one type of image object different from the text object are extracted by the object extraction unit
the pixel-value transformer is configured to set a reduction amount by transformation of the first pixel value into the second pixel value of the color of the developer having the small remaining amount in such a manner that the reduction amount for the text object is smaller than the reduction amount for the image object, wherein the small remaining amount equals the second pixel value minus the first pixel value.

13. The image formation apparatus according to claim 12, wherein
the pixel-value transformer is configured to set a larger reduction amount for a color of a developer having a small remaining amount than the other colors of the developers having large remaining amounts.

* * * * *